July 25, 1967  J. F. COPLIN  3,332,241
GAS TURBINE ENGINE
Filed Nov. 9, 1964  2 Sheets-Sheet 1

Inventor
JOHN FREDERICK COPLIN

By Cushman, Darby & Cushman
Attorneys

United States Patent Office 3,332,241
Patented July 25, 1967

3,332,241
GAS TURBINE ENGINE
John Frederick Coplin, Littleover, Derby, England, assignor to Rolls-Royce Limited, Derby, England, a company of Great Britain
Filed Nov. 9, 1964, Ser. No. 409,761
Claims priority, application Great Britain, Dec. 3, 1963, 47,806/63
1 Claim. (Cl. 60—226)

This invention concerns a gas turbine engine having an engine driven fan.

According to the present invention, there is provided gas turbine engine having an annular main duct within which compressor means, combustion equipment, and turbine means are arranged in flow series, an annular fan duct which surrounds at least part of the annular main duct, a by-pass duct disposed between said annular main duct and said annular fan duct, said by-pass duct arranged to receive part of the air compressed by said compressor means, an engine-driven rear fan rotor disposed in said annular fan duct, blading disposed at the downstream end of said by-pass duct integrally joining fan rotor blades and turbine rotor blades, and fan rotor supporting means including outlet guide vanes which are mounted in said annular main duct immediately downstream of said turbine means and which carry only one bearing disposed inwardly of said annular main duct, said fan rotor being supported on one side thereof only with the opposite side being unsupported.

Figure 1:
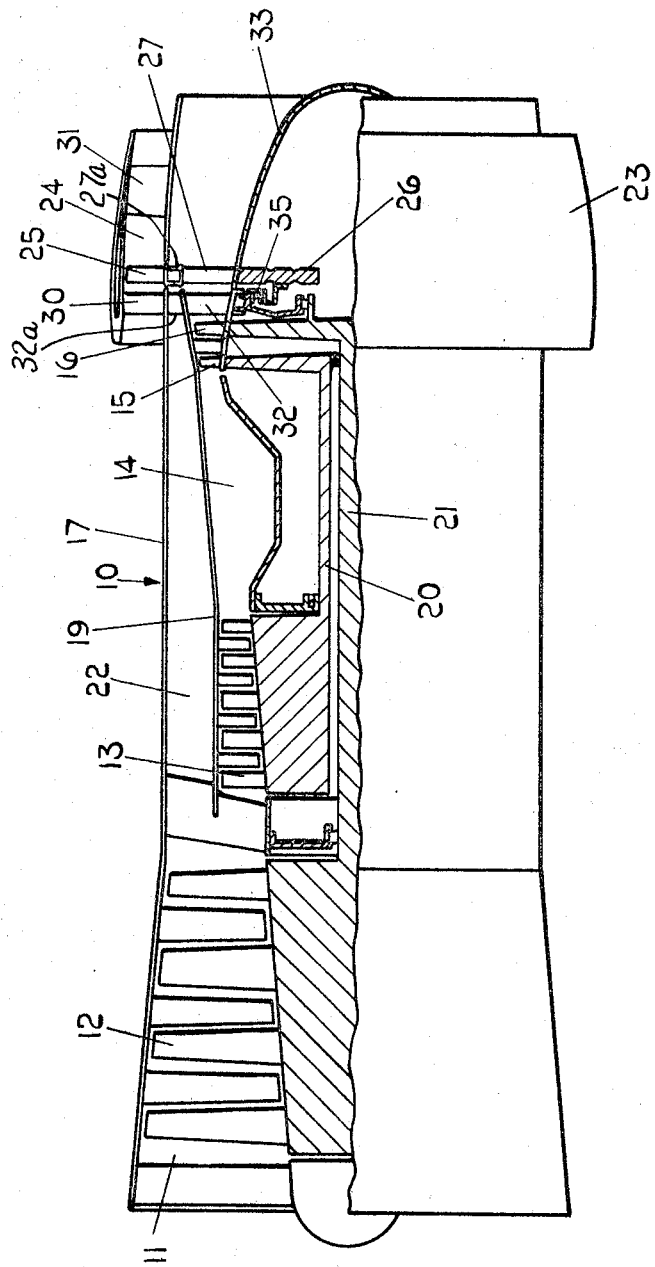
Figure 2:
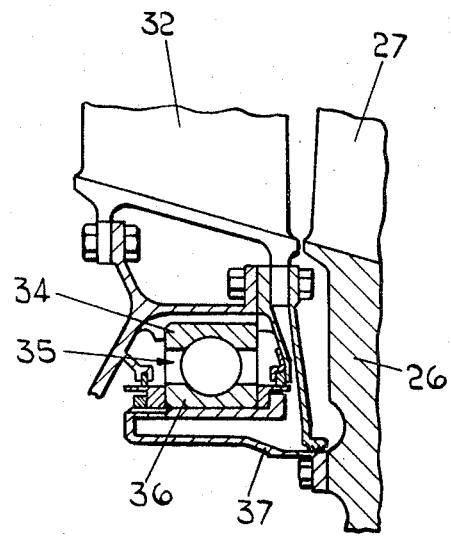

The invention is illustrated, merely by way of example, in the accompanying drawings, in which:

FIGURE 1 is a diagrammatic part-sectional view of a gas turbine engine according to the present invention, and FIGURE 2 is a broken-away sectional view on a larger scale of part of the structure shown in FIGURE 1.

Referring to the drawings, a gas turbine engine 10 adapted for use as a forward propulsion engine of an aircraft comprises an annular main duct 11 within which there are arranged in flow series a low pressure compressor 12, a high pressure compressor 13, combustion equipment 14, a high pressure turbine 15, and a low pressure turbine 16. The engine 10 has an engine casing 17 through the downstream part of which the turbine exhaust gases are discharged to atmosphere.

The high pressure turbine 15 drives the high pressure compressor 13 through a shaft 20. The low pressure turbine 16 drives the low pressure compressor 12 through a shaft 21, the shaft 21 being mounted concentrically within the shaft 20.

A casing 19 defines an annular by-pass duct 22 which is arranged concentrically around at least a portion of the annular main duct 11. The by-pass duct 22 is arranged to receive part of the air compressed by the low pressure compressor 12, the by-pass duct 22 by-passing the high pressure compressor 13, the combustion equipment 14 and the turbines 15, 16.

The gas turbine engine 10 is an aft fan engine having a fan cowl 23 which defines an annular fan duct 24, the fan duct 24 being arranged concentrically about the by-pass duct 22. Within the annular fan duct 24 there are mounted fan rotor blades 25 of a fan rotor 26. The fan rotor 26 has turbine blades 27 which are integral with blading 27a and with the fan rotor blades 25, the turbine blades 27 are disposed in the annular main duct 11 downstream of the turbines 15, 16, and the blading 27a is disposed at the downstream end of the by-pass duct 22.

The fan cowl 23 is supported by fan inlet guide vanes 30 and by struts 31. The inlet guide vanes 30 are connected to, or integral with vanes 32a and, outlet guide vanes 32. The vanes 32a are disposed in the by-pass duct 22 just forward of the blading 27a whereas the outlet guide vanes 32 are mounted in the annular main duct 11 immediately downstream of the low pressure turbine 16. The struts 31 extend from the fan cowl 23 to the engine casing 17.

A tail cone 33 is mounted on the downstream side of the fan rotor 26 and is secured thereto so as to rotate therewith. In order to reduce weight, the casing 19 does not extend downstream of the fan rotor 26, the by-pass air from the by-pass duct 22 being mixed with the turbine exhaust gases in the area between the downstream part of the engine casing 17 and the tail cone 33.

The outlet guide vanes 32 carry the outer race 34 of a ball bearing 35 which is disposed inwardly of the annular main duct 11. The ball bearing 35 has an inner race 36 which is connected by "hairpin" structure 37 to the fan rotor 26 on one side only thereof. As will be seen from the drawings, the opposite side of the fan rotor 26 is unsupported.

It will thus be appreciated that the fan rotor 26 is rotatably mounted by means of the bearing 35 only, and that this bearing is carried by the guide vanes 30, 32 which it would in any case be necessary to provide. Thus, the fan rotor 26 is rotatably mounted by means which do not involve additional struts crossing the various ducts 11, 22, 24.

I claim:

A gas turbine engine having an annular main duct; compressor means, combustion equipment and turbine means arranged in flow series in said annular main duct; an annular fan duct surrounding at least part of the annular main duct; a by-pass duct disposed between said annular main duct and said annular fan duct, said by-pass duct being arranged to receive part of the air compressed by said compressor means; an engine-driven fan rotor having fan rotor blades disposed in said annular fan duct and turbine rotor blades disposed in said main duct; blading disposed at the downstream end of said by-pass duct integrally joining said fan rotor blades and said turbine rotor blades; and means supporting said engine-driven rear fan rotor on only one side of the same with the opposite side being unsupported, said engine-driven rear fan rotor support means including outlet guide vanes mounted in said annular main duct immediately downstream of said turbine means, and only one bearing carried by said inlet guide vanes and disposed inwardly of said annular main duct.

References Cited

UNITED STATES PATENTS

| 2,455,458 | 12/1948 | Whittle | 230—122 |
| 2,703,477 | 3/1955 | Anxionnaz | 60—35.6 |
| 3,002,675 | 10/1961 | Howell et al. | 60—35.6 |
| 3,070,285 | 12/1962 | Oldfield. | |

FOREIGN PATENTS

| 920,886 | 3/1963 | Great Britan. |

MARK NEWMAN, Primary Examiner.

D. HART, Assistant Examiner.